United States Patent Office 3,367,905
Patented Feb. 6, 1968

3,367,905
STABILIZER FOR BICYCLOHEPTENE-
CARBOXYLIC POLYMERS
Walter M. Zimberg, Tonawanda, and Russel A. Bowman, Clarence, N.Y., assignors to Hooker Chemical Corporation, Niagara Falls, N.Y., a corporation of New York
No Drawing. Filed Sept. 29, 1964, Ser. No. 400,219
6 Claims. (Cl. 260—45.7)

ABSTRACT OF THE DISCLOSURE

Alkaline earth metal oxides and alkaline earth metal hydroxides are incorporated into polymers which contain bicycloheptene carboxylic compounds as an integral part of their structure. Such polymers include unsaturated polyester resins of a polyhydric alcohol and a polycarboxylic compound such as a Diels-Alder reaction product of hexachlorocyclopentadiene and an alpha, beta-unsaturated polycarboxylic compound, and polyurethanes, resulting from the reaction of a polyester with an isocyanate or isocyanate prepolymer. The additive compounds reduce the tendency for corrosive attack on metal molds by such polymers.

---

This invention relates to the use of a stabilizer for polyester type and polyurethane type polymers and resins which contain as part of their integral structure bicycloheptenecarboxylic compounds as exemplified by chlorendic acid.

Polymers and resins which contain as an integral part of their structure bicycloheptenecarboxylic compounds have been found useful as fire-retardant materials. However, these polymers prior to crosslinking and conversion into final useful articles by techniques, such as molding, have tended to exhibit some less desirable characteristics. Among these are the tendency for corrosive attack on metal molds used in match molding of useful products. Additionally, it is desirable to extend the uncatalyzed stability of these resins and polymers. There has now been found a stabilizer which effectively suppresses these tendencies.

In accordance with this invention there is provided a composition of matter comprising (1) a polyester resin which comprises the esterification product of a polyhydric alcohol and a carboxylic compound which is the Diels-Alder reaction product of (a)

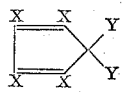

and (b) an alpha, beta-unsaturated carboxylic compound, wherein X is selected from the group consisting of bromine, chlorine and fluorine, and Y is selected from the group consisting of bromine, chlorine, fluorine, alkyl and alkoxy; and (2) a stabilizer selected from the group consisting of alkaline earth metal hydroxide and alkaline earth metal oxide compounds.

The resins and polymers of this invention to be protected by the method of the present invention may be utilized either as the esterification product of the polyhydric alcohol and the halogenated bicycloheptene carboxylic compound or may be admixed with an isocyanate or isocyanate prepolymer so that the resulting composition is a polyurethane or the polyester may be admixed with any vinylidene monomer to make copolymer compositions. In preparing the polyester resins and polymers of this invention, it is preferred to employ polyhydric alcohols having only two hydroxy groups, although minor amounts of alcohol having three or more hydroxy groups may also be used. Among the dihydroxy alcohols which may be used are ethylene glycol, 1,2-propylene glycol, 1,3-propylene glycol, diethylene glycol, dipropylene glycol, 1,4-butanediol, 1,3-butanediol, 1,2-pentenediol, 1,3-pentenediol, 1,3-pentenediol, 1,6-hexanediol, nepentyl glycol, and the like. Among the other polyhydroxy alcohols which may be employed are glycerol, hexenetriol, butanetriol, dimethylolpropene, trimethylolethane, pentaerythritol, dipentaerythritol, and so forth. Mixtures of various di- and polyhydric alcohols may be used. Additionally, polyhydric alcohols may be employed which are Diels-Alder adducts of hexachlorocyclopentadiene, such as 2,3-dimethylol-1,4,5,6,7,7-hexachlorobicyclo-(2.2.1)-5-heptene.

The halogenated bicycloheptene carboxylic compounds employed to esterify the polyhydric alcohols enumerated above are the Diels Alder reaction products of a halogenated cyclopentadiene and an alpha, beta-unsaturated carboxylic compound. The halogenated cyclopentadienes suitable for use in preparation of the halogenated bicycloheptene carboxylic compounds are those cyclopentadienes of the formula

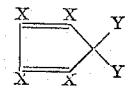

wherein X is selected from the group consisting of bromine, chlorine and fluorine, and Y is selected from the group consisting of bromine, chlorine, fluorine, alkyl and alkoxy. Preferably the alkyl and alkoxy groups contain from one to six carbon atoms. Among the suitable cyclopentadienes are hexachlorocyclopentadiene, 5,5-dimethoxytetrachlorocyclopentadiene, hexabromocyclopentadiene, 5,5-dibromotetrachlorocyclopentadiene, 5,5-difluorotetrachlorocyclopentadiene, 5,5-dimethyltetrachlorocyclopentadiene, 5,5 - diethyltetrachlorocyclopentadiene and 5,5-diethoxytetrachlorocyclopentadiene. The alpha, beta-unsaturated carboxylic acids used in preparing the halogenated bicycloheptene carboxylic compounds of this invention comprise a small and rather well defined class of organic carboxylic compounds. Among the acids and anhydrides in this class are isocrotonic, crotonic, maleic, fumaric acids and maleic anhydride. The preferred carboxylic compounds of this invention are the alpha, beta-unsaturated alkylene carboxylic compounds of 3 to 5 carbon atoms. Among the most preferred carboxylic compounds are maleic acid and maleic anhydride. The resulting halogenated bicycloheptene carboxylic compounds suitable for use in this invention are illustrated by chlorendic acid and chlorendic anhydride.

The halogenated bicycloheptene carboxylic compounds function as saturated carboxylic compounds in the polyester composition and have no sites available for crosslinking within a vinylidene comonomer which might be employed. Therefore, it is desirable when contemplating the use of the vinylidene comonomer to use in the preparation of the polyester resin, an alpha, beta-unsaturated polybasic acid having 4 to 6 carbon atoms such as maleic, fumaric, aconitic, itaconic acids and the like, as part of the total acid charged. These unsaturated acids may be present to the extent of 80 percent by weight of the total polymer basic acid and preferably between about 25 and 65 percent by weight of the total weight of polybasic acid.

The ratio of polybasic acid to polyhydric alcohol may be expressed as a carboxyl-hydroxy ratio and may vary over a range such as 0.25:1 to 1.5:1. Generally, however, a hydroxyl-carboxyl ratio of at least 1 is preferred when employing the resins and polymers of this invention as a polyester type material. However, the lower ratios are preferred when the final polymer is to be of the polyurethane type.

Since the polyester resins described are frequently solids or very viscous liquids, their use in molding applications is enhanced and facilitated by the employment of a liquid polymerizable monomeric compound which serves as a diluent or solvent for the polyester resins, and which may be readily cured to a solid by copolymerization with the polymerizable components of the polyester. These monomers are vinylidene monomers, that is, a compound containing a group capable of copolymerization with fumarate and maleate unsaturation. The proportion of monomer to unsaturated polyester resins may be varied over a wide range, depending on the compounds employed and the properties desired. Generally, from about 5 percent to about 70 percent of monomer, based on weight of polyester, is preferred.

Curative or crosslinking agents for the polyester composition may be added to the composition in their pure form, or they may be added in a solution in an inert organic solvent such as phthalate esters, including dimethyl and dioctylphthalate, and cresylphosphate esters. The concentrations in which the curatives are used range from 0.01 percent by weight of the unsaturated polymer composition to about 10 percent by weight, while the preferred range is between about 0.1 percent and about 5 percent by weight of the unsaturated polyester resin. Examples of such catalysts include cumene hydroperoxide, benzoyl peroxide, ditertiarylbutyl peroxide, lauryl peroxide, and ketone peroxides such as methylethyl ketone peroxide, methyl vinyl ketone peroxide, and the like.

In addition to the curing agents, driers or accelerators may be used to promote the curing of the polyester type compositions of the invention. In general, these driers include metal salts of organic acids (metal soaps), amines such as dibutylamine and mercaptans such as dodecyl mercaptan. These accelerators include the cobalt, lead, manganese, zinc and iron soaps of organic acids. Preferred organic acids from which metal soaps are prepared include naphthenic acid, octoic acid, stearic acid are lauric acid. Of these accelerators, the most preferred is cobalt naphthenate because of its better solubility and activity. Quantities of these accelerators when used in the compositions of this invention will depend, of course, on the nature of the polyester, peroxide curing agent, and accelerator used, but in general, amounts of accelerator between about 0.02 percent and 10 percent by weight, based on the polymer composition, have proved useful.

The preceding discussion has been devoted to the resins and polymers per se of this invention and to useful compositions employing these resins and polymers.

The stabilizer of this invention is a compound selected from the group consisting of alkaline earth metal hydroxides and alkaline earth metal oxides. By alkaline earth metal it is meant to describe the elements magnesium, calcium, strontium and barium. These stabilizers are exemplified by magnesium oxide, magnesium hydroxide, calcium oxide, calcium hydroxide, strontium oxide and hydroxide, and barium oxide and hydroxide. Alkaline earth metal oxides are also known as alkaline earths.

The preferred stabilizer of this invention is lime, which may be in either its oxide or hydroxide form, that is, calcium oxide or calcium hydroxide, which is also known as hydrated lime, and mixtures thereof. Unless otherwise specified in this specification the term "lime" is to be understood to include the foregoing. It has been found convenient to employ the hydrated form. It is preferable that the lime stabilizer of this invention have a fineness such that it will pass through a No. 100 sieve of the U.S. Standard Sieve Series (1940), that is, a sieve having an opening of 0.0059 inch across. The amount of stabilizer to be employed in this invention will vary, depending upon the exact conditions. However, generally from 0.01 to about 7.0 percent is satisfactory. Preferably the amount employed will be about from 0.02 percent to about 5.0 percent by weight of the polyester composition.

It is also within the scope of this invention to add reinforcing media to the polyester compositions to achieve a particular balance of physical properties desired. Such reinforcing media include glass fibers, glass cloth, glass mats, glass roving, synthetic fibers made of acrylonitrile or nylon, mineral fibers such as asbestos, natural fibers such as wool or cotton, and metallic fibers such as aluminum or steel.

Suitable fillers for use with the polyester composition includes inorganic materials such as clay and pigments such as zinc oxide or titanium oxide, and organic materials such as wood flour, cotton and rayon flock and dyes.

The stabilizer of this invention may be added to the resins and polymers of this invention which contain as an integral part thereof halogenated bicycloheptene carboxylic compounds either during the process of manufacturing of these resins and polymers or at a convenient time subsequent to the manufacture thereof. It is to be recognized, however, that earlier addition of the stabilizer to the resins and polymers of this invention will tend to enhance its stabilizing effect. The stabilizer may be blended with the other constituents of the composition in any suitable or milling equipment.

The stabilized resins and polymers of this invention are thereafter crosslinked or "cured," after addition of the desired fillers, reinforcing media and curatives, by subjecting the final composition to an elevated temperature for a predetermined period of time. The temperature of cure will vary depending upon the time and cure required for the ingredients employed. Generally speaking, however, a temperature from about 50 to 175 degrees centigrade may be employed, a preferred range being from about 70 to 120 degrees centigrade. Similarly, the time of cure will vary from 1 to about 90 minutes depending upon the cure required, temperature of the cure and the ingredients employed. It may also be desirable to have a post-cure in the curing cycle.

Various modifications of the plastic products disclosed will be apparent to those skilled in the art. The following examples are presented to illustrate the invention further, but are not limiting. All parts and percentages are by weight and all temperatures are in degrees centigrade, unless otherwise indicated.

POLYESTER A

To a resin kettle were charged 87.25 parts of hexachlorocyclopentadiene, heated to about 150 degrees centigrade. Then 52.4 parts of maleic anhydride were charged to the vessel. After approximately two hours, 34.3 parts of ethylene glycol were added to the reaction mixture. Various amounts of commercially available hydrated lime as indicated in the examples below was then added. The reaction vessel was purged with nitrogen. The esterification was allowed to proceed until a temperature of about 180 degrees centigrade was reached and the esterification product had an acid number of about 23. The resin was then styrenated to 40 parts per styrene content per 100 parts of base resin. The resin composition had a Gardner Viscosity of X plus three seconds and a Gardner Color number of 18 plus.

POLYESTER B

An unsaturated polyester resin was prepared by reacting in a stainless steel resin kettle 82 parts of hexachlorocyclopentadiene and 58.8 parts of maleic anhydride at a temperature of about 160 degrees centigrade. After about an hour the temperature had risen to 175 degrees centigrade at which time the ethylene glycol (38.4 parts) was gradually added. During this addition the reaction vessel was purged with nitrogen. Then the desired amount of powdered lime (all through a U.S. sieve No. 100) was charged to the reaction mixture. The esterification proceeded until an acid number of about 28 had been obtained. Thereafter, this resin was also styrenated with 40 parts of styrene per 100 parts of resin.

To the foregoing resins were added varying amounts of lime in finely divided form with mixing. The stabilized resins were then tested for corrosion inhibition by exposing a test strip approximately 3 inches long by ½ inch wide by 0.008 inch thick of Federal-Mogul's Series 1002–S Steel Shim Stock (a carbon steel) partially immersed in 200 grams of the resin composition in tightly sealed test tubes at temperature of 95 degrees centigrade for the times listed below. Upon completion of these tests, the metal specimens were microscopically examined (approximately 30 power) for corrosion effects.

| Example | Resin | Lime (percent by weight) | Time (hours) | Corrosion Rate (inches/year) | Remarks |
|---|---|---|---|---|---|
| 1 | A | 0.5 | 13 | 0.00362 | Very good. No sign of attack. |
| 2 | A | 0.36 | 21.75 | 0.0032 | Excellent. No sign of attack. |
| 3 | A | 0.1 | 96 | 0.00119 | Do. |
| 4 | A | None | 13 | 0.00896 | Badly etched in liquid phase. |
| 5 | B | 0.5 | 23.5 | 0.00223 | Excellent. No sign of attack. |
| 6 | B | None | 23.5 | 0.00465 | Do. |

In a similar manner, such stabilization is achieved when the stabilizer is a barium magnesium or strontium oxide or the respective hydroxides thereof.

*Example 7*

Samples of Polyester A were tested for storage stability at 70 degrees centigrade. These samples were uncatalyzed, i.e., did not contain a crosslinking or curing agent. These samples were placed in stoppered glass containers and stored in a circulating air oven at 70 degrees centigrade. The samples were periodically inspected to determine when the resin became unsatisfactory for use in preparing useful articles by the match molding process. The control sample containing no inhibitor gelled, that is, advanced to the crosslink state in approximately four days. A test sample containing 0.5 percent of lime on the basis of the total styrenated resin product, finally gelled, after 26 days.

Various changes and modifications may be made in the method of this invention, certain preferred forms which have been described, and equivalents may be substituted, without departing from the spirit and scope of this invention.

What is claimed is:

1. A composition of matter comprising (1) a polyester resin which comprises the esterification product of a polyhydric alcohol and a polycarboxylic compound which is the Diels-Alder reaction product of (a)

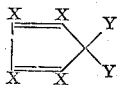

and (b) and alpha, beta-unsaturated polycarboxylic compound, wherein X is selected from the group consisting of bromine, chloride and fluorine, and Y is selected from the group consisting of bromine, chlorine, fluorine, alkyl and alkoxy, and (2) a stabilizer selected from the group consisting of calcium oxide and calcium hydroxide, wherein the stabilizer is present in an amount between 0.01 and 7.0 percent by weight of the polyester resin.

2. The composition according to claim 1 wherein the alpha, beta-unsaturated polycarboxylic compound contains 3 to 5 carbon atoms.

3. A composition of matter comprising (1) a polyester resin which comprises the esterification product of a polyhydric alcohol, an unsaturated polycarboxylic compound, and a polycarboxylic compound which is the Diels-Alder reaction product of (a)

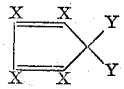

and (b) an alpha, beta-unsaturated polycarboxylic compound, wherein X is selected from the group consisting of bromine, chlorine and fluorine, and Y is selected from the group consisting of bromine, chlorine, fluorine, alkyl and alkoxy, and (2) lime, wherein the lime is present in an amount between 0.01 and 7.0 percent by weight of polyester resin.

4. The composition according to claim 3 wherein the alpha, beta-unsaturated polycarboxylic compound contains 3 to 5 carbon atoms.

5. A composition of matter comprising (1) a polyester resin which comprises the esterification product of a dihydric alcohol and a polycarboxylic compound which is the Diels-Alder reaction product of (a) hexachlorocyclopentadiene and (b) maleic anhydride, and (2) from 0.01 to 7.0 percent by weight of the polyester resin of lime.

6. A composition of matter comprising (1) a polyester resin which consists of the esterification product of a polyhydric alcohol, an alpha, beta-unsaturated polycarboxylic compound having 4 to 6 carbon atoms and a polycarboxylic compound which consists of the Diels-Alder reaction product of (a)

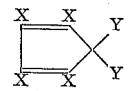

and (b) an alpha, beta-unsaturated polycarboxylic compound, wherein X is selected from the group consisting of bromine, chlorine and fluorine, and Y is selected from the group consisting of bromine, chlorine, fluorine, alkyl and alkoxy, and (2) a stabilizer selected from the group consisting of alkaline earth metal oxide and an alkaline earth metal hydroxide, wherein the stabilizer is present in an amount between 0.01 and 7.0 percent by weight of the polyester resin.

References Cited

UNITED STATES PATENTS

| 3,269,977 | 8/1966 | Andres et al. | 260—40 |
| 2,897,176 | 7/1959 | Rocky et al. | 260—45.8 X |
| 3,249,565 | 5/1966 | Robitschek | 260—45.95 X |

DONALD E. CZAJA, *Primary Examiner.*

LEON J. BERCOVITZ, *Examiner.*

M. J. WELSH, *Assistant Examiner.*